(12) United States Patent
Chung et al.

(10) Patent No.: US 9,806,311 B2
(45) Date of Patent: Oct. 31, 2017

(54) BATTERY PACK CAPABLE OF DISCHARGING GASES IN POUCH TYPE BATTERY CELL

(71) Applicant: LG Chem, Ltd., Seoul (KR)

(72) Inventors: Seung Hyun Chung, Daejeon (KR); Geun Chang Chung, Daejeon (KR)

(73) Assignee: LG Chem, Ltd. (KR)

( * ) Notice: Subject to any disclaimer, the term of this patent is extended or adjusted under 35 U.S.C. 154(b) by 473 days.

(21) Appl. No.: 14/556,680

(22) Filed: Dec. 1, 2014

(65) Prior Publication Data

US 2015/0086817 A1    Mar. 26, 2015

Related U.S. Application Data

(63) Continuation of application No. PCT/KR2014/003689, filed on Apr. 25, 2014.

(30) Foreign Application Priority Data

May 2, 2013    (KR) ......................... 10-2013-0049351

(51) Int. Cl.
  *H01M 2/12*    (2006.01)
  *H01M 2/02*    (2006.01)
  *H01M 2/10*    (2006.01)

(52) U.S. Cl.
  CPC ....... *H01M 2/1241* (2013.01); *H01M 2/0275* (2013.01); *H01M 2/1061* (2013.01); *H01M 2200/20* (2013.01)

(58) Field of Classification Search
  CPC . H01M 2/0275; H01M 2/1241; H01M 2/1061
  See application file for complete search history.

(56) References Cited

U.S. PATENT DOCUMENTS 2,492,256 A  *  12/1949  Bailiff .................. H01R 11/282
                                                                    439/772
2010/0255368 A1    10/2010  Park et al.
(Continued)

FOREIGN PATENT DOCUMENTS

CN    101904029 A    12/2010
CN    203850367 U    9/2014
(Continued)

OTHER PUBLICATIONS

WO 2011081333 A2 Translation from Patentscope.*
(Continued)

*Primary Examiner* — Barbara Gilliam
*Assistant Examiner* — Nathanael Zemui
(74) *Attorney, Agent, or Firm* — Lerner, David, Littenberg, Krumholz & Mentlik, LLP

(57) ABSTRACT

The present invention relates to a battery pack capable of discharging gases in a pouch type battery cell when a gas pressure inside the pouch type battery cell is increased over a reference pressure, the battery pack including: a plurality of pouch type battery cells; a case comprising partitions suppressing the pouch type battery cells from expanding in a thickness direction thereof, wherein the pouch type battery cells are respectively held in spaces defined by the partitions; and a punching unit installed on the case to pierce a portion of surfaces of the pouch type battery cells, which is not supported by the partition, and having pin members of which number is equal to that of the pouch type battery cells.

4 Claims, 4 Drawing Sheets

(56) References Cited

U.S. PATENT DOCUMENTS

| | | | |
|---|---|---|---|
| 2011/0129702 A1* | 6/2011 | Ahn | H01M 2/0207 |
| | | | 429/53 |
| 2012/0107676 A1 | 5/2012 | Han et al. | |
| 2012/0125447 A1* | 5/2012 | Fuhr | H01M 2/0262 |
| | | | 137/260 |
| 2015/0086817 A1 | 3/2015 | Chung et al. | |

FOREIGN PATENT DOCUMENTS

| | | |
|---|---|---|
| JP | 2007-141778 A | 6/2007 |
| JP | 2010-186786 A | 8/2010 |
| KR | 20090065587 A | 6/2009 |
| KR | 20110075789 A | 7/2011 |
| KR | 2012-0136750 A | 12/2012 |
| KR | 2013-0000014 A | 1/2013 |
| WO | WO 2011081333 A2 * | 7/2011 .......... H01M 2/1235 |

OTHER PUBLICATIONS

Extended European Search Report for Application No. 14791384.2 dated Jul. 23, 2015.
International Search Report from PCT/KR2014/003689, dated Aug. 8, 2014.

\* cited by examiner

BATTERY PACK CAPABLE OF DISCHARGING GASES IN POUCH TYPE BATTERY CELL

CROSS-REFERENCE TO RELATED APPLICATIONS

The present application is a continuation of International Application No. PCT/KR2014/003689 filed Apr. 25, 2014, which claims the priority of Korean Patent Application No. 10-2013-0049351 filed on May 2, 2013, in the Korean Intellectual Property Office, the disclosures of which are incorporated herein by reference.

TECHNICAL FIELD

The present invention relates to a battery pack capable of discharging gases in a pouch type battery cell, and more particularly, to a battery pack capable of discharging gases in a pouch type battery cell when a gas pressure inside the pouch type battery cell is increased over a reference pressure to expand the pouch type battery cell.

BACKGROUND ART

In general, in line with technological development and increasing demands for mobile devices, demands for secondary batteries are also increasing sharply, and, most of all, lithium (ion/polymer) secondary batteries having a high energy density, a high operation voltage, and excellent storage and life characteristics are widely used as an energy source for various electronic products as well as mobile devices.

Korea Patent Publication No. 2009-0065587 discloses a pouch type secondary battery with improved safety, in which a channel is formed in a cell and on a sealing part of an electrode tap. When gas is excessively generated in the pouch to increase pressure due to overcharging, internal short, and the like, the gas may be discharged to the outside of the pouch through the channel. In other words, when the gas in the cell is discharged to the outside, the gas is always discharged through the sealing part of the electrode tap, so that a gas discharge direction may be predicted in advance.

Meanwhile, a reference pressure at which gases inside the pouch type secondary battery are discharged may be varied according to specifications and operation conditions of electronic/mechanical devices on which the pouch type secondary battery is installed. That is, some electronic/mechanical devices need to discharge gases even if an internal gas pressure of the pouch type secondary battery is slightly increased, whereas other electronic/mechanical devices do not need to discharge gases even when the internal gas pressure of the pouch type secondary battery is significantly increased.

However, the disclosed patent is disadvantageous in that, when a gas discharge reference pressure of the pouch type secondary battery required by the respective electronic/mechanical devices is varied, a design for the sealing part should be changed.

It is assumed that a pouch type secondary battery is manufactured according to a gas discharge reference pressure required by a specific electronic/mechanical device and installed on the electronic/mechanical device. However, when the preset gas discharge reference pressure is considered inappropriate for the electronic/mechanical device during operation and thus the gas discharge reference pressure needs to be increased or decreased, there is a limitation in that the existing pouch type secondary battery should be entirely replaced by a pouch type secondary battery having a newly changed gas discharge reference pressure.

SUMMARY OF THE INVENTION

To solve the above-described limitations, an aspect of the present invention provides a battery pack which does not need to change a design of a pouch type battery cell according to a gas discharge reference pressure.

Another aspect of the present invention provides a battery pack, capable of simply changing a gas discharge reference pressure of a pouch type battery cell included in the battery pack which is already installed on an electronic/mechanical device.

According to an aspect of the present invention, there is provided a battery pack according to a preferred embodiment includes: a plurality of pouch type battery cells; a case comprising partitions suppressing the pouch type battery cells from expanding in a thickness direction thereof, wherein the pouch type battery cells are respectively held in spaces defined by the partitions; and a punching unit installed on the case to pierce a portion of surfaces of the pouch type battery cells, which is not supported by the partition, and having pin members of which number is equal to that of the pouch type battery cells.

The pouch type batter cell may include a protruding part at a surface thereof to protrude toward a region where the pin member is installed.

The case may have a space which allows the plurality of pouch type battery cells to expand in a width direction thereof.

The pin members may be installed on the case so that a distance between the pin member and a surface of the pouch type battery cell is adjustable.

The battery pack may include an adjusting lever configured to adjust a position of each of the pin members.

The battery pack may include an adjusting lever configured to simultaneously adjust positions of the pin members.

The battery pack may further include: a first gear interlocked with each of the pin members to convert a rotational movement to a linear movement in a longitudinal direction of the pin member; and an adjusting shaft having a plurality of second gears engaged with a plurality of first gears, and rotating along with rotation of the adjusting lever.

According to the present invention, it is possible to provide a battery pack which does not need to change a design of a pouch type battery cell according to a gas discharge reference pressure.

In addition, it is possible to provide a battery pack capable of simply changing a gas discharge reference pressure of a pouch type battery cell included in the battery pack which is already installed on an electronic/mechanical device.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
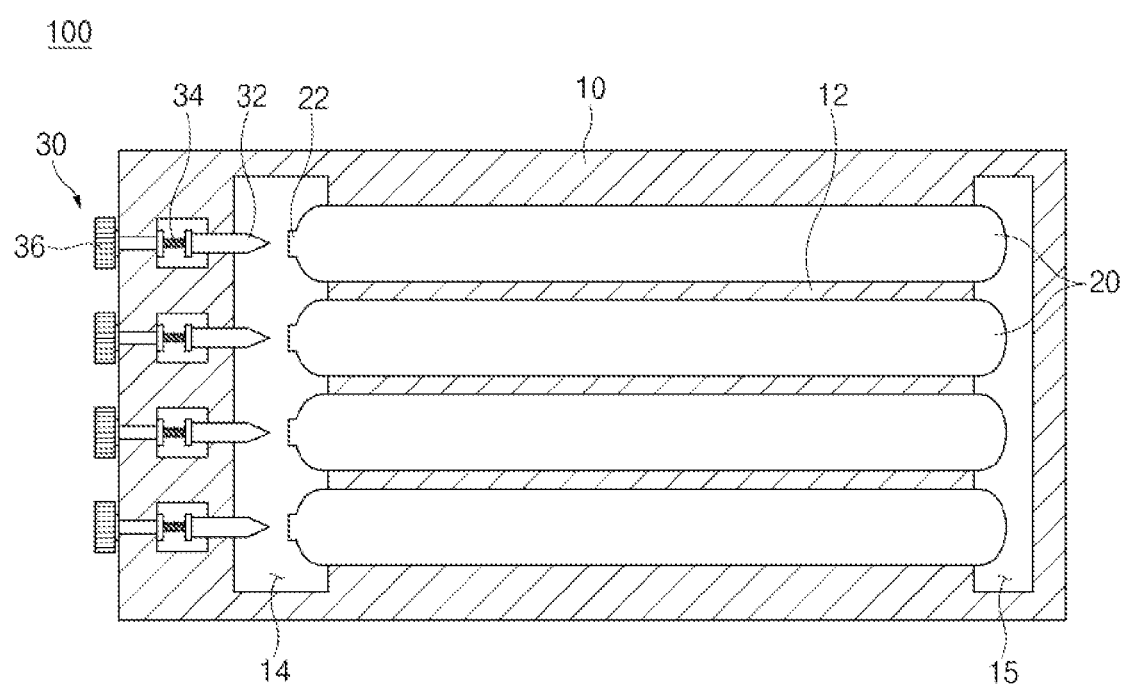
FIG. 1 is a longitudinal sectional view of a battery pack according to a first embodiment of the present invention.

Exemplary embodiments of the present invention will now be described in detail with reference to the accompanying drawings.

Terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways. Accordingly, it should be considered that embodiments set forth herein and configurations illustrated in drawings are merely preferred embodiments of the invention and do not represent the technical spirit of the present invention. Therefore, it will be understood that, at the time of filing of the present application, they can be replaced with a variety of these equivalents and modifications.

Each component in the drawing or the size of the components that make up a specific part may be exaggerated, omitted or schematically illustrated for clarity and convenience of description. Thus, the size of each component does not utterly reflect an actual size. In the following description of the present invention, a detailed description of known functions or configurations incorporated herein will be omitted to avoid making the subject matter of the present invention unclear.

[First Embodiment]

Figure 2:
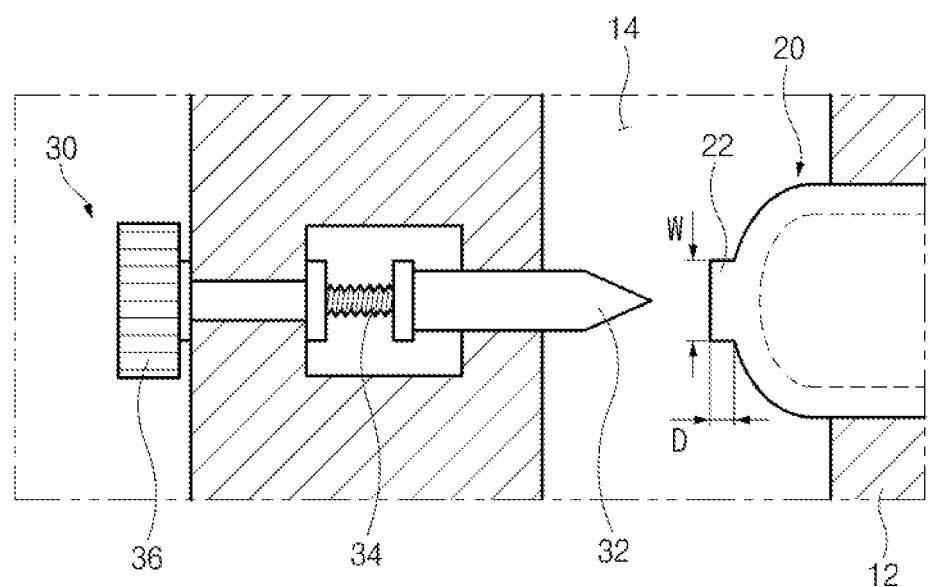
FIG. 2 is a partially enlarged view of a punching unit included in the battery pack in FIG. 1.
Figure 3:
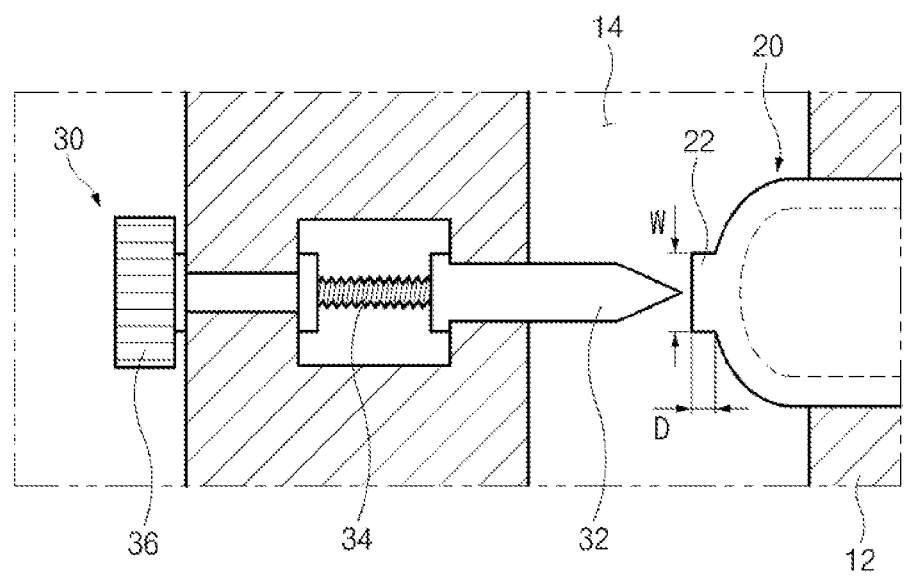
FIG. 3 illustrates a situation where a pin member included in the punching unit in FIG. 2 approaches towards a pouch type battery cell.

FIG. 1 is a longitudinal sectional view of a battery pack according to a first embodiment of the present invention, FIG. 2 is a partially enlarged view of a punching unit included in the battery pack in FIG. 1, and FIG. 3 illustrates a situation where a pin member included in the punching unit in FIG. 2 approaches towards a pouch type battery cell.

It should be noted that FIGS. 1 to 3 illustrate only partial configurations as cross sections to easily understand components.

Referring to FIGS. 1 to 3, a battery pack 100 according to a first embodiment of the present invention includes a plurality of pouch type battery cells 20, a case 10 holding the plurality of pouch type battery cells 20, and a punching unit 30 having pin members 32 of which number is equal to that of the pouch type battery cells 20.

The pouch type battery cells 20 hold an electrode assembly therein, which has a cathode plate, an anode plate, and a separator, and electrode leads are connected to electrode taps extending from each of the cathode and anode plates. It is noted that the above structure is a typical structure of the pouch type battery cells 20, and thus is not specifically illustrated in drawings. The electrode assembly is held in an area indicated by a dotted line of the pouch type battery cells in FIGS. 2 and 3.

The case 10 includes partitions 12 suppressing the pouch type battery cells 20 from expanding in a thickness direction thereof, and the pouch type battery cells 20 are respectively held in spaces defined by the partitions 12.

Each of the pouch type battery cells 20 is disposed between two partitions 12 or between the partition 12 and an inner side of the case 10. In addition, either side of the pouch type battery cell 20 is in contact with the partition 12 or the inner side of the case 10.

When gas is excessively generated in the pouch type battery cell 20 to increase pressure due to overcharging, internal short, and the like, the pouch type battery cell 20 is expanded. Since the pouch type battery cell 20 is suppressed from expanding in the thickness direction thereof by means of the partition 12 or the inner side of the case 10, both ends of the pouch type battery cell 20 is expanded when viewed from FIG. 1. Of course, the both ends of the pouch type battery cell 20 may expand in a thickness direction as well as a width direction.

Accordingly, suppressing the pouch type battery cell 20 from expanding in the thickness direction thereof by the partition 12 does not means suppressing the entire region of the pouch type battery cell 20 from expanding in the thickness direction thereof; but rather means suppressing the pouch type battery cell 20 from expanding in the thickness direction thereof in a region where the pouch type battery cell 20 is in contact with the partition 12.

Meanwhile, the case 10 has spaces 14 and 15 to allow the pouch type battery cells 20 to expand in the width direction thereof.

The pin member 32 of the punching unit 30 is installed on the case 10 to pierce a portion of surfaces of the pouch type battery cells 20, which is not supported by the partition 12. Also, the pin member 32 may be installed on the case 10 to adjust a distance from the surface of the pouch type battery cell 20.

For example, a position of the pin member 32 may be adjusted by using an adjusting lever 36 and a screw thread 34. FIGS. 2 and 3 illustrate that the adjusting lever 36 is rotatably installed on the case 10, the screw thread 34 is formed on an end portion of the adjusting lever 36, a bore is formed at the center of the pin member 32, a female screw is formed in the bore, and the screw thread 34 is inserted into the female screw.

The pin member 32 may have a key on a surface thereof such that the pin member 32 only linearly moves toward or away from the pouch type battery cell 20 without rotating with reference to the case 10, and the case 10 may have a key groove at a position corresponding to the key. Alternatively, the pin member 32 may be designed to have a polygonal section such as rectangular and hexagonal sections, thereby preventing rotation of the pin member 32.

When the adjusting lever 36 is rotated, the screw thread 34 rotates and the pin member 32 does not rotate. Thus, the female screw formed on the bore of the pin member 32 moves relative TO the screw thread 34 to allow the pin member 32 to linearly move toward or away from the pouch type battery cells 20.

The adjusting lever 36 is configured to adjust the position of the pin member 32 and installed on each of the pin members 32, and therefore, the number of pin members 32 is equal to the number of the adjusting levers 36.

The pouch type battery cell 20 may have a protruding part 22 formed at the surface thereof to protrude toward a region where the pin member 32 is installed. A width W and depth D of the protruding part 22 may be variously designed. When the protruding part 22 is designed to have great width W and depth D, it is advantageous in that the pouch type battery cell 20 is not easily punched although the pouch type battery cell 20 is brought into contact with the pin member 32 due to careless handling.

The position of the pin member 32 may be adjusted from a configuration in FIG. 2 to a configuration in FIG. 3 and vice versa. Furthermore, the distance between the pin member 32 and the pouch type battery cell 20 may be further increased by use of the adjusting lever 36 compared with the distance illustrated in FIG. 2.

In comparison with the configuration in FIG. 3, the pouch type battery cell 20 in FIG. 2 is pierced by the pin member 32 to discharge gases inside the pouch type battery cell 20, only if the pouch type battery cell 20 considerably expands. On the contrary, in comparison with the configuration in FIG. 2, the pouch type battery cell 20 in FIG. 3 is pierced by the pin member 32 to discharge gases inside the pouch type battery cell 20, even if the pouch type battery cell 20 slightly expands.

When a reference pressure for discharging internal gases of the pouch type battery cell 20 to the outside is high, the pin member 32 may be adjusted to approach toward the pouch type battery cell 20 as illustrated in FIG. 3 by using the adjusting lever 36. On the contrary, when a reference pressure for discharging inner gases of the pouch type battery cell 20 to the outside is low, the pin member 32 may be adjusted to move far away from the pouch type battery cell 20 as illustrated in FIG. 2 by using the adjusting lever 36.

In other word, it is possible to meet various gas discharge standards of the pouch type battery cell 20 by only adjusting the position of the pin member 32, without changing a design of the pouch type battery cell itself each time.

Furthermore, in the case where a pouch type battery cell 20 included in the battery pack 100 which has been already installed on electronic/mechanical devices needs to change a gas discharge reference pressure, it is advantageous in that such a change may be achieved by only adjusting the adjusting lever 36, without replacing the battery pack 100 itself.

[Second Embodiment]

Figure 4:
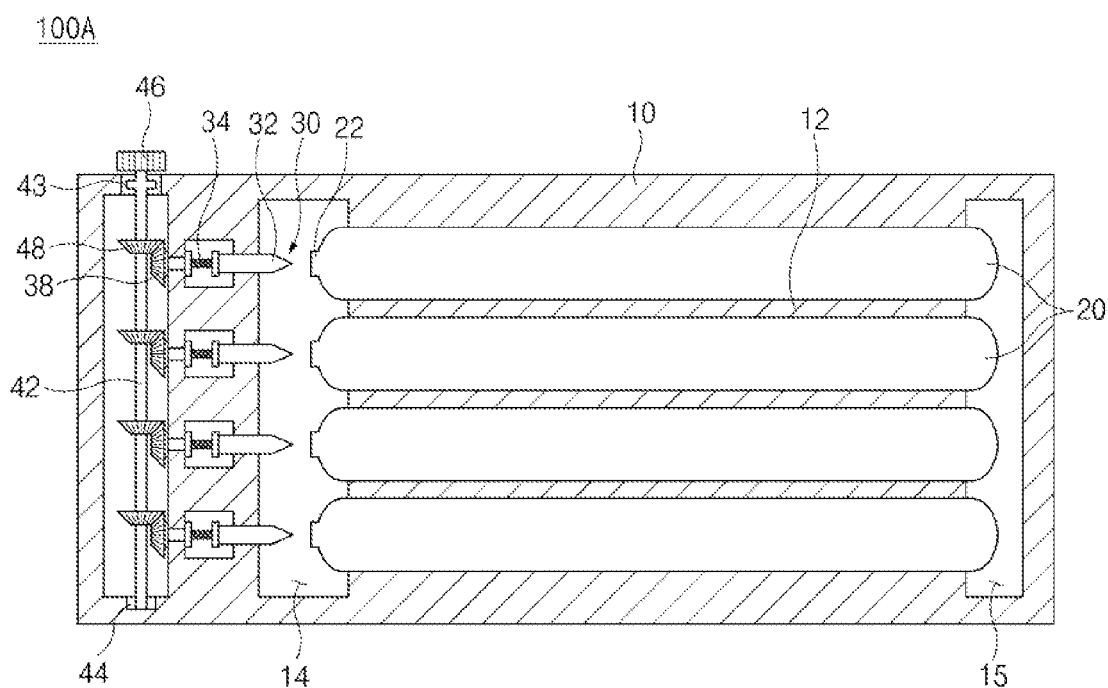
FIG. 4 is a longitudinal sectional view of a battery pack according to a second embodiment of the present invention.

FIG. 4 is a longitudinal sectional view of a battery pack according to a second embodiment of the present invention.

Contents common to the first embodiment will be omitted to avoid duplicate explanation and a description will be focused on contents different from those of the first embodiment.

A battery pack 100A according to the second embodiment of the present invention has a different configuration of a punching unit 30.

Referring to FIG. 4, structures of a pin member 32 and a screw thread 34 of the punching unit 30 in the second embodiment are same as those in the first embodiment. However, a first gear 38 instead of an adjusting lever 36 is placed at a position corresponding to the adjusting lever 36 in the first embodiment.

The first gear 38 is interlocked with each of pin members 32 to convert a rotational movement to a linear movement in a longitudinal direction of the pin member 32, and engaged with a second gear 48 which will be described later.

A plurality of second gears 48 are provided, of which number is equal to number of the first gears 38, and the plurality of second gears 48 are disposed along a plurality of thin and long adjusting shafts 42. Bearings 43 and 44 may be installed on a case 10 for smooth rotation of the adjusting shaft 42.

An adjusting lever 46 of which a position is relatively fixed to the adjusting shaft 42 is formed on an end portion of the adjusting shaft 42. Although the first gear 38 and the second gear 48 are illustrated as a bevel gear, the first and second gears 38 and 48 are not limited to the bevel gear only, and thus various configurations having the same function as the bevel gear may be used.

When the adjusting lever 46 rotates, the adjusting shaft 42 rotates along with the adjusting lever 46. Then, the plurality of second gears 48 fixed to the adjusting shaft 42 rotate, and the first gears 38 also rotate because the first gears 38 and the second gears are engaged with each other.

When the first gear 38 rotates, the screw thread 34 rotates and the pin member 32 does not rotate. Thus, a female screw formed on a bore of the pin member 32 moves relative to the screw thread 34, so that the pin member 32 linearly moves toward or away from the pouch type battery cell 20.

In the second embodiment, each of the pin members 32 may be simultaneously adjusted by using one adjusting lever 46.

[Modified Embodiment]

In the first and the second embodiments, the pin member 32 may be adjusted by moving toward or away from the pouch type battery cell 20.

However, a modified embodiment may be presumed in which components of the punching unit 30 other than the pin members 32 are excluded.

In this modified embodiment, while having pin members 32 with various lengths, a relatively shorter pin member 32 is installed in the case 10 when the gas discharge reference pressure of the pouch type batter cell 20 is high; and a relatively long pin member 32 is installed in the case 10 when the reference pressure of discharging gas of the pouch type batter cell 20 is low. Thus, the battery pack of the modified embodiment can be applied to gas discharge various reference pressures without changing a structure of the pouch type battery cell 20 as illustrated in the first and the second embodiments.

While the present invention has been shown and described in connection with the exemplary embodiments, it will be apparent to those skilled in the art that modifications and variations can be made without departing from the spirit and scope of the invention as defined by the appended claims.

This application claims the priority of Korean Patent Application No. 10-2013-0049351 filed on May 2, 2013 in the Korean Intellectual Property Office, the disclosures of which are expressly incorporated herein by reference in their entireties.

The invention claimed is:

1. A battery pack, comprising:
    a plurality of pouch type battery cells;
    a case comprising partitions suppressing the pouch type battery cells from expanding in a thickness direction thereof, wherein the pouch type battery cells are respectively held in spaces defined by the partitions;
    a punching unit installed on the case to pierce a portion of surfaces of the pouch type battery cells, which is not supported by the partition, and having pin members of which number is equal to that of the pouch type battery cells, the pin members being installed on the case so that a distance between each pin member and a surface of the pouch type battery cells is adjustable;
    an adjusting lever configured to simultaneously adjust a position of each of the pin members;
    wherein the adjusting lever is rotatably installed on the case, the screw thread is formed on an end portion of the adjusting lever, a bore is formed at the center of the pin member, a female screw is formed in the bore, and the screw thread is inserted into the female screw, and
    wherein each pin member has a key on a surface thereof and the case has a key groove at a position corresponding the key.

2. The battery pack of claim 1, wherein the pouch type batter cell comprises a protruding part at a surface thereof to protrude toward a region where the pin member is installed.

3. The battery pack of claim 1, wherein the case has a space which allows the plurality of pouch type battery cells to expand in a width direction thereof.

4. A battery pack comprising:
- a plurality of pouch type battery cells;
- a case comprising partitions suppressing the pouch type battery cells from expanding in a thickness direction thereof, wherein the pouch type battery cells are respectively held in spaces defined by the partitions; and
- a punching unit installed on the case to pierce a portion of surfaces of the pouch type battery cells, which is not supported by the partition, and having pin members of which number is equal to that of the pouch type battery cells,
- wherein the pin members are installed on the case so that a distance between each pin member and a surface of the pouch type battery cells is adjustable,
- wherein the battery pack comprises an adjusting lever configured to simultaneously adjust positions of the pin members,
- a first gear interlocked with each of the pin members to convert a rotational movement to a linear movement in a longitudinal direction of the pin member; and
- an adjusting shaft having a plurality of second gears engaged with a plurality of first gears, and rotating along with rotation of the adjusting lever.

* * * * *